(No Model.)
F. MUNSON.
HOSE COUPLING.
No. 577,774. Patented Feb. 23, 1897.
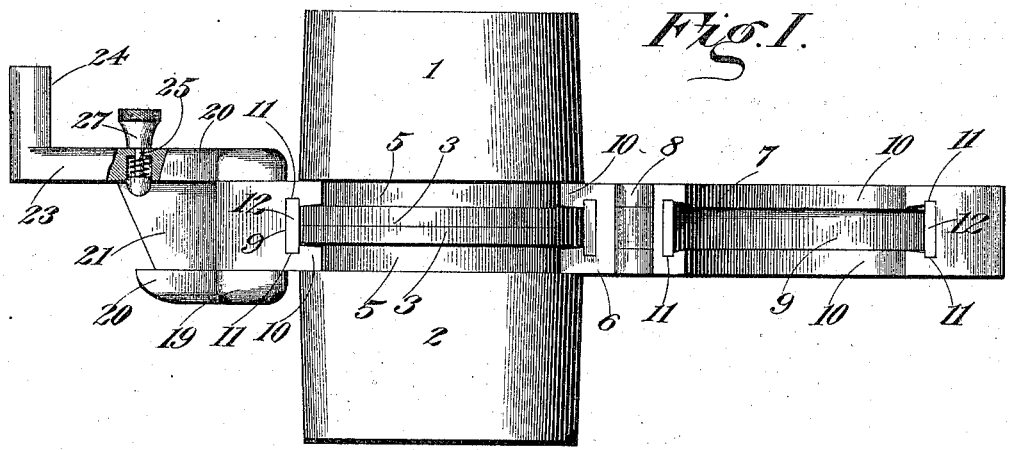
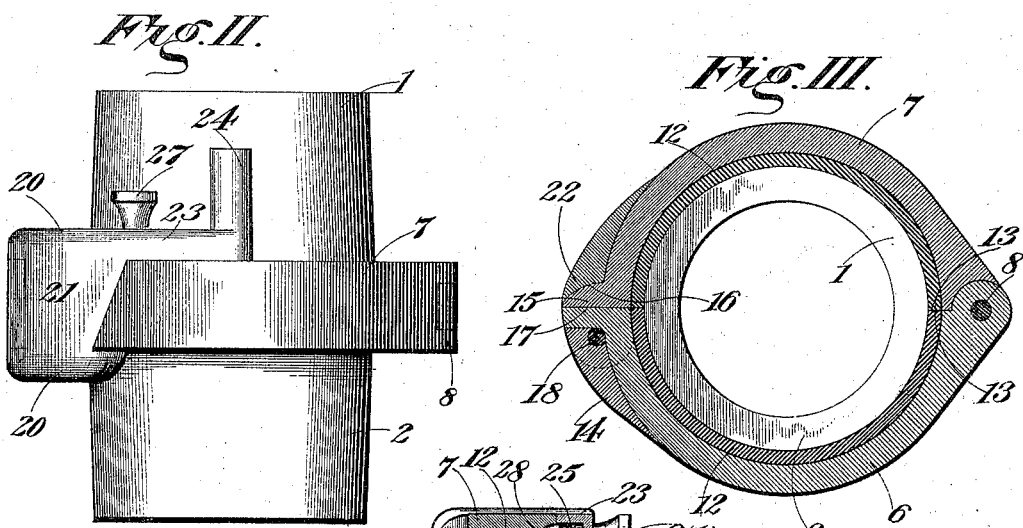
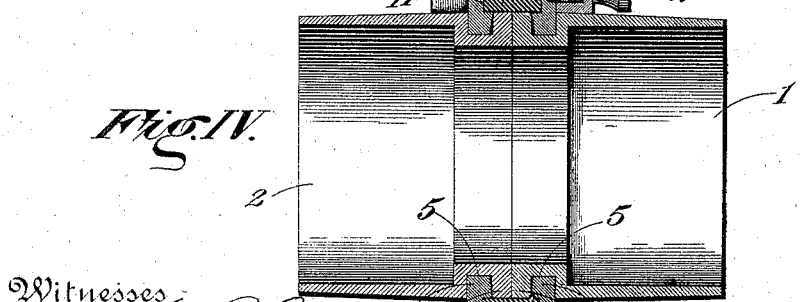
Witnesses
M. Fowler
S. Nacker
Inventor
Frank Munson
By Joseph L. Atkins
Attorney

UNITED STATES PATENT OFFICE.

FRANK MUNSON, OF ITHACA, MICHIGAN.

HOSE-COUPLING.

SPECIFICATION forming part of Letters Patent No. 577,774, dated February 23, 1897.

Application filed January 7, 1896. Serial No. 574,580. (No model.)

*To all whom it may concern:*

Be it known that I, FRANK MUNSON, of Ithaca, county of Gratiot, State of Michigan, have invented certain new and useful Improvements in Hose-Couplings, of which the following is a specification, reference being had to the accompanying drawings.

The object of my invention is to produce a simple coupling that is adapted to secure, without the use of screw-threads or twisting, the sections of a hose together or one section of a hose to a hydrant or other connection, for example.

In the accompanying drawings, Figure I is an elevation of two sections of hose inserted in one half of my coupler, with the other part open. Fig. II is a similar view showing the parts closed and looking toward the latching mechanism. Fig. III is a section through the coupler, taken transversely to the axis of the hose, showing the coupler closed and the coöperation of the latching mechanism with the hinged part of the coupler. Fig. IV is a section taken at right angles to the view shown in Fig. III, illustrating the inclination of the coupler-flanges and looking toward the latching mechanism, which is shown in the closed position.

Referring to the figures on the drawings, 1 and 2 indicate, respectively, the body parts of two ordinary hose-terminals, illustrated by way of example of that class of terminal connections whose distinctive feature is a flange 3, which projects beyond the end of the hose-section and affords means for uniting one hose-section to another or one hose-section to a hydrant or similar connection. When the faces of the flanges 3 are placed together, as shown in Fig. I, they constitute in effect one continuous boss or rib, having on its opposite sides depressed spaces or grooves 5.

6 indicates one-half of my coupler, and 7 the other half. They are substantially semicircular in shape, and being hinged together, as indicated at 8, are designed to clamp upon the ends of abutting hose-sections to the sizes to which they are adapted to be applied, and being secured in place to form a water-tight joint at the place of union between the sections.

The parts 6 and 7 may be made of metal castings and are provided with an internal groove or channel 9, which extends continuously around the entire inner periphery of both parts of the coupler when in the closed position. The channel is defined by exterior bounding-flanges 10, whose inner walls are slightly inclined, as illustrated, so as to exert a wedging action upon the abutting flanges 3 of the hose-couplings when in place upon them to force them closely together. In the bottom of the channel or groove 9, and preferably defined by lateral grooves 11, is a packing-seat carrying securely a strip of rubber or other packing 12. This packing, when the parts 7 and 8 are closed upon the coupling, is compressed against the outer edges of the flanges 3 and forms therewith a water-tight joint.

In order that there may be no escape of water through the joints of the coupler, I provide at each end of each of the halves 6 and 7 a projecting packing-face 13, that may consist of an extension of the packing-strip 12. These ends or packing-faces, when the coupler is closed, abut against each other and insure a continuous water-tight joint throughout the entire length of both packing-rings united.

The ends of the parts 6 and 7 opposite the hinge 8 are provided, respectively, the one with a bearing-piece 14 and the other with a cam 15, having a curved surface 16. The plane face 17 of the bearing-piece and the cam, respectively, are, when closed, in a radial plane with the hose or coupler axis, and in that position lie flat against each other. A bearing-piece 14 accommodates the pintle 18 of a latch 19, whose legs 20 straddle the part of the coupler which carries the bearing-piece 14, the pintle 18 being inserted through the opposite legs of the latch and the bearing-piece 14.

21 indicates a bridge which unites the legs and which is provided with a curved face 22, that fits over the cam 16, and continues to draw it toward the bearing-piece 14 until the latch has reached its completely-closed position, at which time the coupler is perfectly closed and the joint between it and the hose-sections or similar connections is completed.

I prefer to provide the latch with fastening mechanism for securing it in the closed position, and for this purpose I provide one of the legs with a grooved extension 23 and a handle 24 at its end. When the latch is closed, the extension 23 is in alinement with one half of the coupler and may be secured thereto. I provide in the latch, preferably in the extension 23, a spring-actuated pin 25, which is urged by its spring toward the coupler and which may be retracted, as by means of its head 27.

28 indicates an aperture in the coupler with which the pin 25 may engage when the latch is closed, and thereby secure the coupler in fixed position.

What I claim is—

The combination with two pivotally-united parts of a hose-coupler, of a latch upon one part, a cam upon the other part adapted to cooperate with the latch to close the coupler, a pin upon the latch, an aperture in that part of the coupler that carries the cam adapted to receive the pin and fasten the latch, and a handle upon the latch, substantially as set forth.

In testimony of all which I have hereunto subscribed my name.

FRANK MUNSON.

Witnesses:
 JAMES CLARKE,
 WESLEY G. CLARK.